United States Patent Office.

CHARLES T. KINGZETT, OF 17 LANSDOWNE ROAD, TOTTENHAM, AND MAXIMILIAN ZINGLER, OF 19 BUCKLAND CRESCENT, BELSIZE PARK, COUNTY OF MIDDLESEX, ENGLAND.

PRODUCTION OF DISINFECTANTS.

SPECIFICATION forming part of Letters Patent No. 274,789, dated March 27, 1883.

Application filed December 12, 1882. (No specimens.) Patented in England January 24, 1876, No. 274; in France July 24, 1876, No. 113,904; in Belgium July 25, 1876, No. 40,103; in Austria September 16, 1877, No. 50, and in Italy August 9, 1878, No. 83.

*To all whom it may concern:*

Be it known that we, CHARLES THOMAS KINGZETT, F. I. C., F. C. S., and MAXIMILIAN ZINGLER, F. C. S., subjects of the Queen of Great Britain, residing, respectively, at 17 Lansdowne Road, Tottenham, and 19 Buckland Crescent, Belsize Park, both in the county of Middlesex, England, have invented certain new and useful Improvements in the Production of Antiseptics and Disinfectants, (for which we have received Letters Patent in Great Britain, No. 274, dated January 24, 1876; in France, No. 113,904, dated July 24, 1876; in Belgium, No. 40,103, dated July 25, 1876; in Italy, No. 83, dated August 9, 1878, and in Austria, No. 50, dated September 16, 1877;) and we do hereby declare that the following is a full, clear, and exact description of the invention, which will enable others skilled in the art to which it appertains to make and use the same.

Our invention consists in the production of improved antiseptics and disinfectants as follows: Turpentine or rosin-spirit, or any essential oil or hydrocarbon which contains a terpene or which contains cymene, we expose to the action of atmospheric oxygen or pure oxygen in the presence of water. The hydrocarbon suffers oxidation and yields peroxide of hydrogen as a product of such change. We oxidize the hydrocarbon by air or oxygen, either in the presence or absence of water. We prefer to employ turpentine as the substance to be oxidized and atmospheric air as the agent of oxidation. The turpentine known as "Russian" turpentine is the most suitable. When turpentine is used in our process it absorbs oxygen and gradually increases in density, and if the process be conducted in the presence of water, which is the preferable method, products of the chemical changes that occur are dissolved by the water, thus giving rise to the formation of an aqueous solution of substances which communicate to the said solution the properties of an antiseptic, disinfectant, deodorizer, oxidant, and germicide. Among these substances are peroxide of hydrogen, camphoric acid, and substances resembling in chemical properties, if not identical with, camphor, thymol, and other camphoraceous bodies. This aqueous solution constitutes one of our chief products. The oil which undergoes oxidation, as hereinbefore described, contains eventually a very active organic peroxide, which we term "camphoric peroxide," and also other substances resembling, if not identical with, camphor and thymol. When this oil is placed in contact with a further quantity of water, peroxide of hydrogen is produced and passes into a state of aqueous solution in the water. This oxidized oil is extremely active as an antiseptic, disinfectant, deodorizer, oxidant, and germicide, and it also constitutes our other chief product. The oxidation of turpentine or other hydrocarbon containing a terpene or cymene may be effected in the absence of water, if we prefer so to conduct the process, and we can then obtain an aqueous fluid, like that described above, from the oxidized hydrocarbon by mixing or shaking up the same with water and afterward separating the aqueous extract. This extract may be applied to the matters to be disinfected or to receive antiseptic treatment by sprinkling or immersion, or otherwise. It may also be used as an antiseptic dressing for wounds. The oil may be similarly employed as such, or it may be mixed or incorporated with earthy or other bases, mixtures, or solid substance or substances, with the object of producing powders, mixtures, or solid compositions possessing properties similar to those of the oil itself. The oil may also be saponified with alkalies, thereby producing soapy mixtures or products; or it may be incorporated with soaps, or with soaps and alkalies, or otherwise used in the production of soaps destined to exhibit antiseptic, disinfecting, and other useful effects. The oil may also be emulsified by admixture with gum-acacia and addition of water, stirring meanwhile, or by otherwise proceeding, and it may be, when desired, diluted with pure or methylated alcohol or ether, or with any other suitable fluid. It may also be made into an emulsion by stirring or agitating it with water containing in solution an alkali or carbonate of any alkaline base.

In order to produce the above-mentioned products, we prefer to proceed as follows; but it will be understood that the mode of proceeding hereinafter described may be modified according to circumstances: Turpentine or other hydrocarbon containing a terpene or cymene, but Russian turpentine by preference, is placed in a series of earthenware or other suitable vessels along with more or less water. Thus we may charge each vessel with, say, thirty gallons of turpentine and sixty gallons of water. These vessels or oxidizers are maintained by any suitable means at a temperature of, say, 140° Fahrenheit, and meanwhile a current of air is blown or drawn through the several oxidizers during a protracted period—say one hundred and twenty hours. Samples may be taken from time to time, and the proper time for arresting the operation is, as respects the aqueous fluid, when the peroxide of hydrogen is at a maximum; and the same oil may be employed to convert more than one quantity of water. For the oil we continue the blowing until the density of 950 to 975 is attained.

Having now described and ascertained the nature of our invention and the manner in which we carry it into practical effect, we hereby declare that we claim—

1. The said invention of the production of antiseptic and disinfecting oil by passage for a protracted period of a current of oxygen gas (either pure or admixed, as in atmospheric air) through turpentine or other hydrocarbon containing a terpene or cymene.

2. The production of an antiseptic and disinfecting aqueous fluid by the passage for a protracted period of a current of oxygen gas (either pure or admixed, as in atmospheric air) through turpentine or other hydrocarbon containing a terpene or cymene while the same is in contact with water, or by subsequently bringing the same into contact with water.

CHARLES THOMAS KINGZETT.
MAXIMILIAN ZINGLER.

Witnesses:
J. WATT,
JOHN DEAN,
Both of 17 Gracechurch St., London.